United States Patent [19]
Tanaka et al.

[11] Patent Number: 5,856,600
[45] Date of Patent: Jan. 5, 1999

[54] PRODUCTION PROCESS OF DEPOLYMERIZED NATURAL RUBBER

[75] Inventors: Yasuyuki Tanaka, Tokyo; Toshiaki Sakaki; Atsuko Kawasaki, both of Hyogo; Masaharu Hayashi, Wakayama; Eiji Kanamaru, Tokyo; Kazuhiko Shibata, Osaka, all of Japan

[73] Assignees: Sumitomo Rubber Industries, Ltd, Hyogo; Kao Corporation, Tokyo; Nitto Denko Corporation, Osaka, all of Japan

[21] Appl. No.: 740,786

[22] Filed: Nov. 1, 1996

[30] Foreign Application Priority Data

Nov. 10, 1995 [JP] Japan ................................ 7-292907

[51] Int. Cl.$^6$ .............................. C07C 1/00; C07C 4/02; C10G 1/00
[52] U.S. Cl. ........................... 585/241; 585/17; 585/615; 585/613; 585/648; 208/433; 208/435
[58] Field of Search ................................ 585/12, 17, 241, 585/615, 648, 613; 208/433, 435, 426

[56] References Cited

U.S. PATENT DOCUMENTS 2,725,415  11/1955  Bevilacqua ............................. 260/742

FOREIGN PATENT DOCUMENTS

| 238795 | 9/1987 | European Pat. Off. . |
| 702029 | 3/1996 | European Pat. Off. . |
| 251126 | 7/1948 | Switzerland . |
| 749955 | 6/1956 | United Kingdom . |

*Primary Examiner*—Glenn Caldarola
*Assistant Examiner*—Thuan D. Dang
*Attorney, Agent, or Firm*—Birch, Stewart, Kolasch & Birch, LLP

[57] ABSTRACT

Described is a process for the production of depolymerized natural rubber, which makes it possible to obtain, at high reaction efficiency, of depolymerized natural rubber in the liquid form and having a narrow molecular weight distribution; and also a process for the production of depolymerized natural rubber which is free from odor or coloring peculiar to natural rubber and is also free from the danger of immediate allergy derived from protein.

The process according to the present invention comprises adding a carbonyl compound to a natural rubber latex, and then subjecting the resulting natural rubber to air oxidation in the presence of a radical forming agent or adding a carbonyl compound to the latex of deproteinized natural rubber and then subjecting the deproteinized natural rubber to air oxidation optionally in the presence of a radical forming agent.

21 Claims, 4 Drawing Sheets

PRODUCTION PROCESS OF DEPOLYMERIZED NATURAL RUBBER

FIELD OF THE INVENTION

This invention relates to a novel process for preparing a depolymerized natural rubber.

BACKGROUND OF THE INVENTION

A depolymerized natural rubber obtained by depolymerization of natural rubber is also called liquid rubber. Having strong adhesive power and excellent crosslinking reactivity, it has been used widely as a raw material for adhesives, pressure-sensitive adhesives, sealing materials, caulking compounds and the like. In addition, it has also been used as a reactive plasticizer for improving processing properties of solid rubber such as compounded rubber for tires.

It is now attracting attention in various industrial fields, because as compared with solid rubber, liquid rubber is advantageous for the production of various products from the viewpoint that it can be easily processed and requires less energy.

In general, a depolymerized natural rubber can be obtained by mastication, pyrolysis, photolysis, chemical decomposition or the like of the natural rubber but the depolymerized natural rubber obtained by such methods has problems, which will be described below, respectively.

Mastication is a method for accelerating reduction in the molecular weight by breaking the rubber molecular chains of the raw material rubber through mechanical action and heat in a roller mill or internal mixer, and then adding a peptizing agent (which is an organic compound giving plasticity even in a small amount of addition, thereby reducing mastication time and is also called a mastication accelerator) such as a mercaptan to the resulting rubber to prevent the recombination of the broken molecular chains. This method permits the production of depolymerized rubber having a low molecular weight, but is accompanied with the problem that the molecular weight distribution is wide and therefore cannot be controlled easily. In pyrolysis, the reaction temperature is high so that not only decomposition but also crosslinking or recombination inevitably occurs, which makes it difficult to control the molecular weight distribution.

Photolysis is a method for breaking the molecular chains with light energy such as ultraviolet light. This method is accompanied with the drawbacks that peroxide or the like at the terminal of ketone, which has been formed by the break of the main chain, causes decomposition successively, serving as a sensitizer so that it is difficult to control the molecular weight or molecular weight distribution and moreover, isomerization reaction tends to proceed from a cis-1,4-structure to a trans-1,4-structure.

As chemical decomposition, ozone degradation, oxidative degradation by an oxidizing agent such as hydrogen peroxide or phenylhydrazine, and oxidative degradation by a metal ionic catalyst are known. Ozone degradation is applied only as an analysis means and industrially, is of no value, because the reaction should be conducted at a low temperature and treatment of a large amount of ozonide is dangerous.

Depolymerized natural rubber making use of oxidative degradation using hydrogen peroxide or phenylhydrazine has already been industrialized. The molecular-weight-reduced natural rubber latex introduced by "Polymer Digest, October issue, 90(1981)" is not the one in which liquefaction has proceeded sufficiently and it takes a solid form. A similar example can also be found in JP-A-58-152075 (the term "JP-A" as used herein means an "unexamined published Japanese patent application"), and the depolymerized natural rubber disclosed therein, which rubber has been obtained by adding hydrogen peroxide to a natural rubber latex and then reacting them while blowing oxygen into them, is a solid rubber having a breaking strength of 3.5 kg.

In "Rev. Gen. Caoutch Plast. Vol. 61, No. 643, 79(1984)", a technique is introduced for obtaining a depolymerized natural rubber having a molecular weight of 3,000 to 20,000 by depolymerizing a natural rubber latex using phenylhydrazine and air. As is apparent from "Makromol. Chem. Vol. 186, No. 12, 2441(1985)", its terminal group is phenylhydrazine which does not have the reactivity necessary for the extension of the main chain. It is also reported in "Makromol. Chem. Rapid Commun. 7, No. 3, 159(1986)" that liquid natural rubber which has a molecular weight of not greater than 10,000, has a Mw/Mn ratio of 1.6, 1.7 or the like, that is, a narrow molecular weight distribution, and has a hydroxyl group at its terminal can be obtained by adding hydrogen peroxide and methanol or tetrahydrofuran to a solution of natural rubber in toluene and then exposing the resulting mixture to ultraviolet rays. It is however reported in "Makromol. Chem. Vol. 189, No. 3, 523(1988)" that as a result of the supplementary test after that, it was found that the intramolecular epoxide group was mistaken for the terminal hydroxyl group.

According to the experiments made by the present inventors, epoxidation and isomerization of the main chain occur upon depolymerization by exposure to ultraviolet rays under the similar conditions and moreover, the formation of functional groups such as carbonyl group, carboxyl group or hydroxyl group was not recognized at the terminal of the molecular chains. Furthermore, the depolymerized natural rubber so obtained had so large molecular weight distribution, that is, Mw/Mn (a weight-average molecular weight/number-average molecular weight ratio, this will apply equally hereinafter) of at least 4 so that its control was difficult.

For producing a crosslinked substance having good rubber elasticity, it is preferred that the molecular weight distribution be as narrow as possible.

The conventional depolymerized natural rubber is accompanied with the problem that because natural rubber, which has not been subjected to deproteinization and therefore has a low purification degree, is used as a raw material, the conventional depolymerized natural rubber cannot be free from the odor peculiar to natural rubber and in addition, is colored owing to the oxidation or the like of protein. Therefore it is difficult to use it for the applications frequently exposed to the public eye, for example, pressure-sensitive adhesives for our familiar products such as daily necessities or nursing products or for albums which are requested to be colorless and transparent. Furthermore, it cannot be used for the products which come in contact with the human body, because there is a potential danger of it causing immediate allergy derived from protein, which has been one of the recent problems.

SUMMARY OF THE INVENTION

A principal object of the present invention is to provide a process for preparing a depolymerized natural rubber in the liquid form, by which the depolymerized natural rubber having a narrow molecular weight distribution can be obtained at high reaction efficiency.

Another object of the present invention is to provide a process for preparing a depolymerized natural rubber which is free from odor or coloring peculiar to natural rubber and is also free from the fear of immediate allergy derived from protein.

In view of overcoming the above-described problems, the present inventors have conducted an extensive investigation and found a novel fact that depolymerization can be conducted at high reaction efficiency by adding a carbonyl compound to a natural rubber latex and subjecting the resulting natural rubber to air oxidation in the presence of a radical forming agent. The depolymerized natural rubber so obtained is in the liquid form and has a narrow molecular weight distribution so that the rubber obtained by vulcanization of such a depolymerized natural rubber has physical properties comparable to conventional vulcanized rubber, leading to the completion of the invention.

In the above finding, the carbonyl compound is believed to bind to the terminal of the molecule of depolymerized natural rubber, thereby controlling repolymerization and stabilizing the depolymerized natural rubber.

In the present invention, it is preferred to use a deproteinized natural rubber as a natural rubber. Such a deproteinized natural rubber is the one from which protein and the like bound to the molecule of natural rubber have been removed by deproteinization so that complex side-reactions due to impurities such as protein can be prevented and uniform contact with air is feasible. The use of deproteinized rubber therefore makes it possible to conduct depolymerization of the main chain of natural rubber more efficiently than the use of the conventional natural rubber.

Described specifically, when deproteinized natural rubber is used in the present invention, it is only necessary to add a carbonyl compound to a latex of deproteinized natural rubber, and then subject the deproteinized rubber to air oxidation. The above-described radical forming agent is not always necessary.

Depolymerization can however be conducted more promptly when the deproteinized natural rubber is subjected to air oxidation in the presence of a radical forming agent.

In the present invention, the term "deproteinized natural rubber" herein means the one having a nitrogen content of 0.1 wt. % or smaller. By using as a starting material a natural rubber which has been subjected to deproteinization and has been purified highly, generation of offensive smell components or coloration during depolymerization reaction, which will otherwise occur owing to the decomposition of protein and the like contained in natural rubber, can be prevented.

The results of the employment of the process according to the present invention will be described next. In the first place, a depolymerized natural rubber in the liquid form which is substantially odorless, is colorless and is free from the fear of causing immediate allergy derived from protein can be obtained. In the second place, the side reactions which may cause a damage to the rubber elasticity, such as epoxidation of the main chain, isomerization and the like, can be suppressed to a remarkably low level. In the third place, a depolymerized natural rubber being in the liquid form and having a narrow molecular weight distribution can be obtained.

The process for preparing a depolymerized natural rubber according to the present invention makes it possible to produce a depolymerized natural rubber at a high decomposition rate.

In particular, when deproteinized natural rubber latex is employed, the decomposition rate shows a further increase and at the same time it becomes free from a fear of immediate allergy derived from protein so that it can be used suitably for adhesives including pressure-sensitive ones and transparent products which are used close to the human body.

DETAILED DESCRIPTION OF THE INVENTION

In the air oxidation of natural rubber according to the present invention, it is desired to increase the contact of the natural rubber with air in order to narrow the molecular weight distribution of a depolymerized natural rubber obtained. The contact with air is increased by vigorous shaking of the solution, vigorous stirring of the solution, vigorous blowing of air into the solution or the like.

Examples of the natural rubber latex usable as a starting raw material in the present invention include, in addition to a field latex available from a natural gum tree, an ammonia-treated latex (for example, high ammonia latex).

The deproteinized natural rubber in the present invention can be produced based on the method (JP-A-6-56902) developed by the present inventors. In this method, purification is conducted by adding protease to a latex such as field latex or ammonia-treated latex to decompose protein, followed by washing repeatedly with a surfactant. The centrifugal separation method is preferably adopted for washing.

Any protease, for example, those derived from bacteria, those derived from fungi and those derived from yeast can be used and no particular limitation is imposed on it. It is however preferred to use the protease derived from bacteria. The protein-decomposition treatment by such the protease can be conducted by adding the protease to a natural rubber latex in a proportion of 0.01 to 10 wt. % (preferably 0.05 to 1.0 wt. %), followed by allowing to stand or stirring for several minutes to one week. It is suited to conduct protein-decomposition treatment at 5°–90° C., preferably 20°–60° C.

The above-described surfactant may be added either at the time of or after protein-decomposition treatment. As the surfactant, anionic surfactant and/or nonionic surfactant can be used. Examples of the anionic surfactant include carboxylic acid based, sulfonic acid based, sulfate ester based and phosphate ester based surfactants. Examples of the nonionic surfactant include polyoxyalkylene ether based, polyoxyalkylene ester based, polyhydric alcohol fatty acid ester based, sucrose fatty acid ester based, and alkyl polyglycoside based surfactants. It is suited to add the surfactant in an amount of 0.001 to 10 wt. % (preferably 0.1 tp 5 wt. %) based on the natural rubber latex.

It is desired that the deproteinized natural rubber obtained by purification has a nitrogen content of 0.1 wt. % or lower, preferably 0.05 wt. % or lower, more preferably 0.02% or lower and is the one which has been subjected to substantially complete protein removal. The deproteinized natural rubber whose nitrogen content falls within the above-described range is the one from which not only water-soluble protein but also protein bonded to the natural rubber molecules have been decomposed and removed by protease and the like. The particularly preferred deproteinized natural rubber is the one which has been purified to the level from which absorption of polypeptide appearing at 3280 cm$^{-1}$ cannot be detected in infrared absorption spectrum of its raw rubber film.

The protein content of natural rubber is generally expressed by the value of 6.3 times the amount of nitrogen content (N %) determined by the Kjeldahl method. The nitrogen content of a fresh natural rubber latex (field latex) is about 3–5 wt. % based on the solid content (about 0.5–0.8% as N %) and that of the commercially available, purified latex and raw rubber (smoked sheet rubber) is at least about 2 wt. % (about 0.3% as N %).

In the present invention, a radical forming agent is used for accelerating air oxidation of natural rubber. Preferred examples of the radical forming agent include peroxide-based, redox-based and azo-based radical forming agents.

Usable examples of the peroxide-based radical forming agent include benzoyl peroxide, di-t-butyl peroxide, potassium persulfate, ammonium persulfate, hydrogen peroxide, lauroyl peroxide, di-isopropyl peroxycarbonate and dicyclohexyl peroxycarbonate.

Usable examples of the redox-based radical forming agent include cumene hydroxyperoxide/Fe (II) salt, hydrogen peroxide/Fe (II) salt, potassium persulfate or ammonium persulfate/sodium sulfite, sodium perchlorate/sodium sulfite, cerium sulfate (IV)/alcohol, amine or starch, peroxide such as benzoyl peroxide or lauroyl peroxide/dimethyl aniline.

Usable examples of the azo-based radical forming agent include azobisisobutyronitrile, methyl azobisisobutyrate, azobiscyclohexane carbonitrile, azobisisobutylamidine hydrochloride and 4,4-azobis-4-cyanovaleric acid.

Examples of the carbonyl compound used in the present invention include various aldehydes and ketones.

Exemples of the aldehydes include formaldehyde, acetaldehyde, propionaldehyde, n-butylaldehyde, n-valeraldehyde, caproaldehyde, heptaldehyde, phenylacetaldehyde, benzaldehyde, tolualdehyde, nitrobenzaldehyde, salicylaldehyde, anisaldehyde, vanillin, piperonal, methylvaleraldehyde, isocaproaldehyde and paraformaldehyde.

Examples of the ketone include acetone, methyl ethyl ketone, methyl-n-propyl ketone, diethyl ketone, isopropyl methyl ketone, benzyl methyl ketone, 2-hexanone, 3-hexanone, isobutyl methyl ketone, acetophenone, propiophenone, n-butylophenone, benzophenone and 3-nitro-4-methylbenzophenone.

The natural rubber latex or deproteinized natural rubber latex is subjected to oxidation reaction when its rubber content concentration is 1–60 wt. %, preferably 1–40 wt. %, more preferably 1–20 wt. %. The concentrations of the natural rubber latex lower than the above range bring about an economical disadvantage. When the concentrations are higher than the above range, on the other hand, the viscosity of the latex rises too high and it becomes difficult to bring the latex into contact with air uniformly.

The radical forming agent is used in the dissolved or dispersed form in the above-described natural rubber latex. It is suited to add the radical forming agent in an amount of 0.05–5 wt. %, preferably 0.1–1 wt. %, based on the rubber content. When the concentration of the radical forming agent is lower than the above range, the air oxidation velocity is slow. Such a concentration is therefore not suited for practical use. When the concentration exceeds the above range, on the other hand, the reactivity does not show an increase proportional to the rise in concentration so that such a concentration is not economically advantageous.

When deproteinized natural rubber is used as described above, the addition of a radical forming agent is not always required. It is possible to conduct depolymerization by air oxidation even without the addition of a radical forming agent. To promote the reaction, however, it is possible, similar to the case of the above natural rubber latex, to add a radical forming agent in an amount of not larger than 5 wt. %, preferably not larger than 1 wt. %.

It is suited to add a carbonyl compound to the natural rubber latex or deproteinized natural rubber latex so that the amount of the carbonyl compound will be not larger than 20 vol. % (V/V %), preferably 1–10 vol. % based on the volume of the latex irrespective of the rubber content. The concentrations of the carbonyl compound exceeding the above range do not cause a problem, but they do not heighten the reactivity and therefore are economically disadvantageous.

In air oxidation, it is desired to bring the solution into uniform contact with air. No particular limitation is imposed on the method to bring the solution into uniform contact with air but it can be effected easily by shaking in a shaking flask, stirring, bubbling to blow air into the solution, or the like.

Air oxidation is generally allowed to proceed at room temperature to 100° C., but no particular limitation is imposed. The reaction is completed generally within about 1–5 hours.

After the completion of the reaction, the reaction product is separated from the reaction mixture, followed by purification. For example, a suitable amount of a salt solution is added to the reaction mixture to cause coagulation, followed by purification.

The depolymerized natural rubber obtained is a liquid rubber obtained by depolymerization of natural rubber or deproteinized natural rubber and has a number-average molecular weight of 50,000 or lower, generally within a range of 50,000–2,000 as measured by gel permeation chromatography (GPC). The depolymerized natural rubber obtained has a narrower molecular weight distribution, more specifically Mw/Mn of 4 or lower.

Here, the reason why the number-average molecular weight is limited to 50,000 or lower is because the rubber having the number-average molecular weight exceeding this range does not take the liquid form sufficiently.

The depolymerized natural rubber available by the present invention contains not more than one epoxy group, which has been formed by the side reaction, per one molecular chain and maintains the same high cis structure as that of the natural rubber. Accordingly, rubber products obtained by crosslinking it have physical properties comparable to those of the products obtained from general natural rubber.

EXAMPLES

The present invention will hereinafter be described in further detail by the referential examples and examples.

Example 1

In a 300-ml shaking flask, 200 ml of a high ammonia latex (solid content: 5 wt. %) having a nitrogen content of 0.26 wt.

% were charged as a natural rubber latex, followed by the addition of potassium persulfate $K_2S_2O_8$ as a radical forming agent in an amount of 1 wt. % based on the rubber content. To the resulting mixture, 2 vol. % of propionaldehyde was added. The latex was adjusted to about pH 10 with $Na_2HPO_4$, followed by shaking in a thermostatic shaking chamber of 65° C., whereby air oxidation was effected. Shaking was conducted with an amplitude of 2 cm and frequency of 135 times/min. At intervals of 1, 2, 3, 5 and 10 hours after the reaction was started, the sampling of the reaction mixture was conducted. To each portion of the reaction mixture, a suitable amount of a 1% calcium chloride solution was added to cause coagulation. The coagulated substance was then dissolved in hexane. The resulting solution was purified three times by the re-precipitation method using methanol, followed by vacuum drying as a final step.

Referential Example 1

(Production of deproteinized natural rubber having a nitrogen content of 0.01 wt. %)

High ammonia latex was diluted to have a solid content of 30%. Upon dilution, 0.05 wt. % of protease (derived from bacteria) and 2% of a surfactant (sodium dodecylsulfate) were added. After the resulting mixture was allowed to stand at room temperature for 24 hours, it was diluted to 10%, followed by centrifugal separation for 20 minutes at 10,000 rpm. The rubber content was then decreased to 10% by further dilution, followed by centrifugal separation under the conditions similar to the above, whereby a deproteinized natural rubber latex having a nitrogen content of 0.011 wt. % was obtained.

Referential Example 2

(Production of deproteinized natural rubber having a nitrogen content of 0.05 wt. %)

In a similar manner to Referential Example 1 except that the amounts of protease and surfactant were decreased to 0.01% and 1%, respectively and centrifugal separation was conducted only once, a deproteinized natural rubber latex having a nitrogen content of 0.054 wt. % was obtained.

Examples 2–5

In each example, in a similar manner to Example 1 except that the deproteinized natural rubber latex having a nitrogen content of 0.01 wt. %, which had been obtained in Referential Example 1, was used and the amount of potassium persulfate was changed, air oxidation was conducted.

Examples 6–10

In each example, in a similar manner to Example 1 except that the deproteinized natural rubber latex having a nitrogen content of 0.05 wt. %, which had been obtained in Referential Example 2, was used and the kind and/or amount of the carbonyl compound was changed, air oxidation was conducted.

Comparative Example 1

In a similar manner to Examples 2–5 except that neither the carbonyl compound nor potassium persulfate was added, air oxidation was conducted.

Comparative Example 2

In a similar manner to Examples 2–5 except that the carbonyl compound was not added and the amount of potassium persulfate was changed to 1 wt. %, air oxidation was conducted.

The amount of potassium persulfate and the kind and amount of the carbonyl compound in Examples 1–10 and Comparative Examples 1 and 2 are shown in Table 1.

TABLE 1

| | $K_2S_2O_8$ | Carbonyl compound (v/v %) | | |
|---|---|---|---|---|
| | (w/w %) | Propionaldehyde | Formaldehyde | Acetone |
| Example 1 | 1.0 | 2 | — | — |
| Example 2 | — | 2 | — | — |
| Example 3 | 0.1 | 2 | — | — |
| Example 4 | 0.5 | 2 | — | — |
| Example 5 | 1.0 | 2 | — | — |
| Example 6 | 1.0 | 5 | — | — |
| Example 7 | 1.0 | 10 | — | — |
| Example 8 | 1 | — | 2 | — |
| Example 9 | 1 | — | — | 2 |
| Example 10 | 1 | — | — | 8 |
| Comp. Ex. 1 | — | — | — | — |
| Comp. Ex. 2 | 1.0 | — | — | — |

The inherent viscosities of the reaction products which were sampled at intervals of a predetermined time in Examples and Comparative Examples were measured by an Ubbellohde viscometer at 30° C. under the condition of a toluene solvent.

A description will next be made of the testing results classified by each item.

Figure 1:
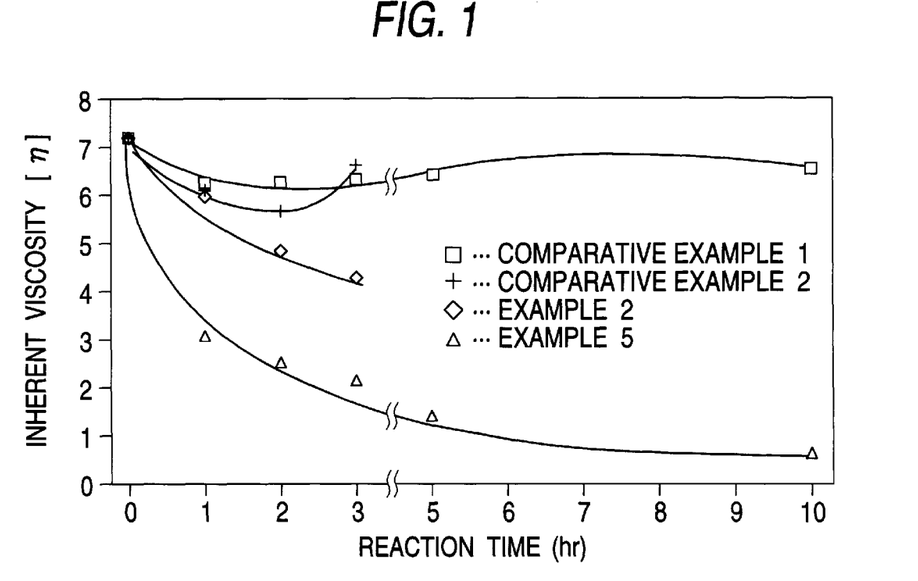
FIG. 1 is a graph illustrating variations of an inherent viscosity to reaction time in Examples 2 and 4 and Comparative Examples 1 and 2.

(1) Evaluation of the addition of a carbonyl compound:

The test results in Examples 2 and 5 and Comparative Examples 1 and 2 are shown in FIG. 1. From FIG. 1, it has been found that the addition of the carbonyl compound alone (Example 2) is more effective for depolymerization than that of the radical initiator alone (Comparative Example 2) and the use of these two in combination promotes depolymerization still more.

Figure 2:
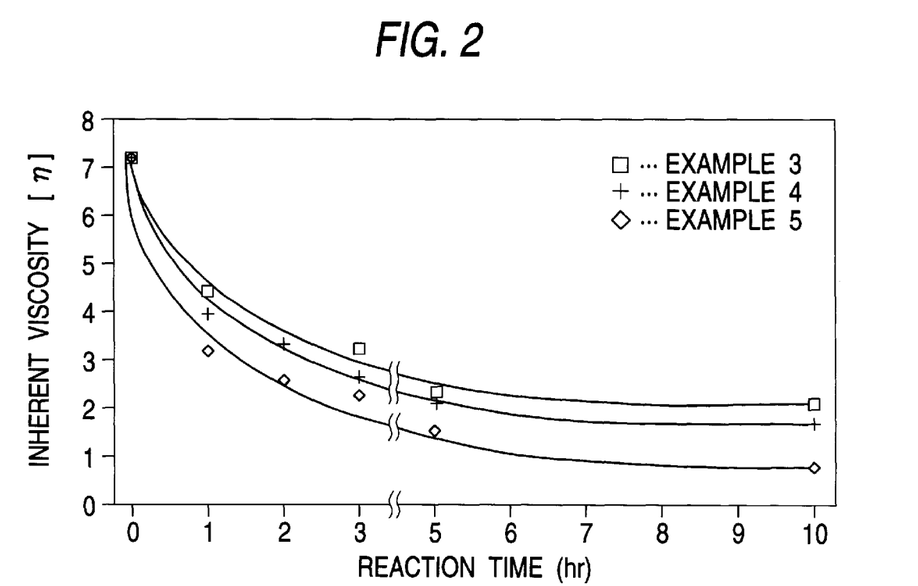
FIG. 2 is a graph illustrating variations of an inherent viscosity to reaction time in Examples 3, 4 and 5.

(2) Evaluation according to the variations in the concentration of the radical initiator:

The test results in Examples 3, 4 and 5 are shown in FIG. 2. From FIG. 2, it has been found that when the amount of the carbonyl compound is fixed, the larger the amount of the radical forming agent is, the more the depolymerization is accelerated.

Figure 3:
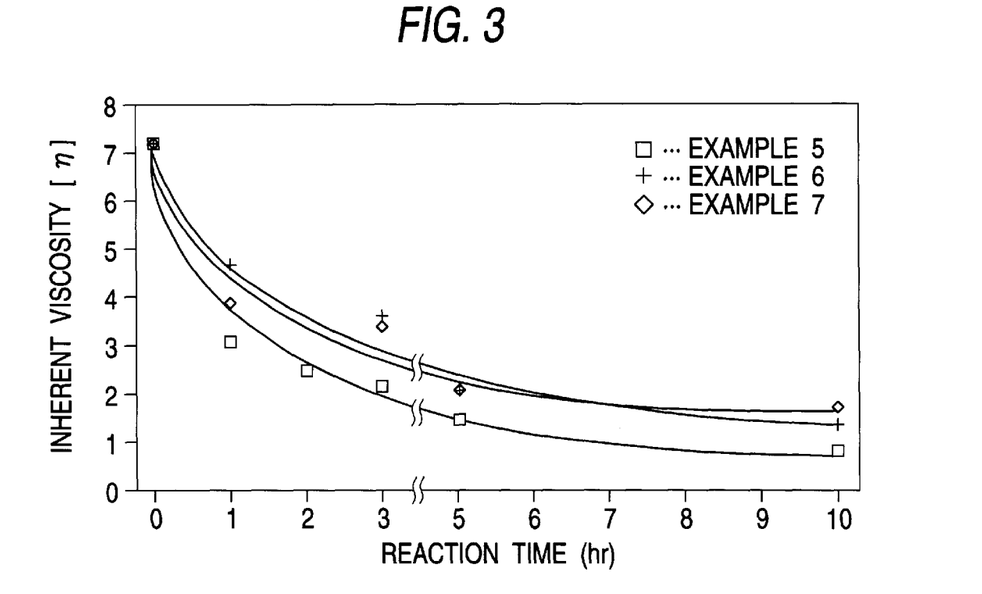
FIG. 3 is a graph illustrating variations of an inherent viscosity to reaction time in Examples 5, 6 and 7.

(3) Evaluation according to the variations in the concentration of a carbonyl compound:

The test results in Examples 5, 6 and 7 are shown in FIG. 3. From FIG. 3, it has been found that when the amount of the radical forming agent is fixed, the effects for depolymerization are high irrespective of the concentration of the carbonyl compound but the amount of the carbonyl compound in an amount of 2 wt. % accelerates the depolymerization most.

Figure 4:
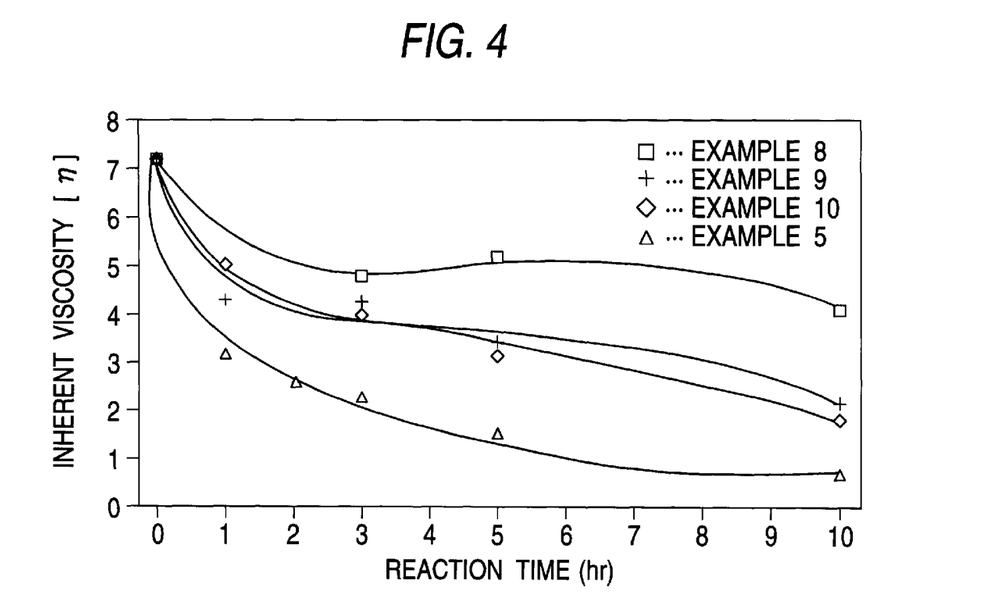
FIG. 4 is a graph illustrating variations of an inherent viscosity to reaction time in Examples 5, 8, 9 and 10.

(4) Evaluation according to the kind of the carbonyl compound:

The test results in Examples 5, 8, 9 and 10 are shown in FIG. 4. From FIG. 4, it has been found that any kind of the carbonyl compound is highly effective for the depolymerization and particularly propionaldehyde is excellent.

Figure 5:
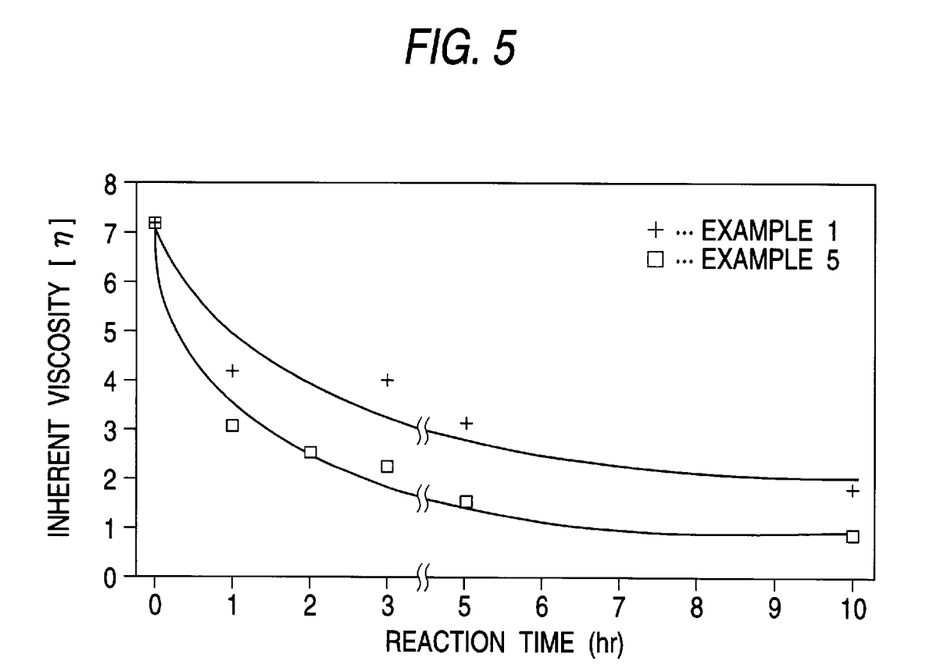
FIG. 5 is a graph illustrating variations of an inherent viscosity to reaction time in Examples 1 and 9.

(5) Evaluation of the influence of the protein contained in the natural rubber latex:

A comparison between Example 1 and Example 5 is shown in FIG. 5. As is apparent from FIG. 5, either latex shows high effects for depolymerization but the deproteinized natural rubber has a higher decomposition rate.

Figure 6:
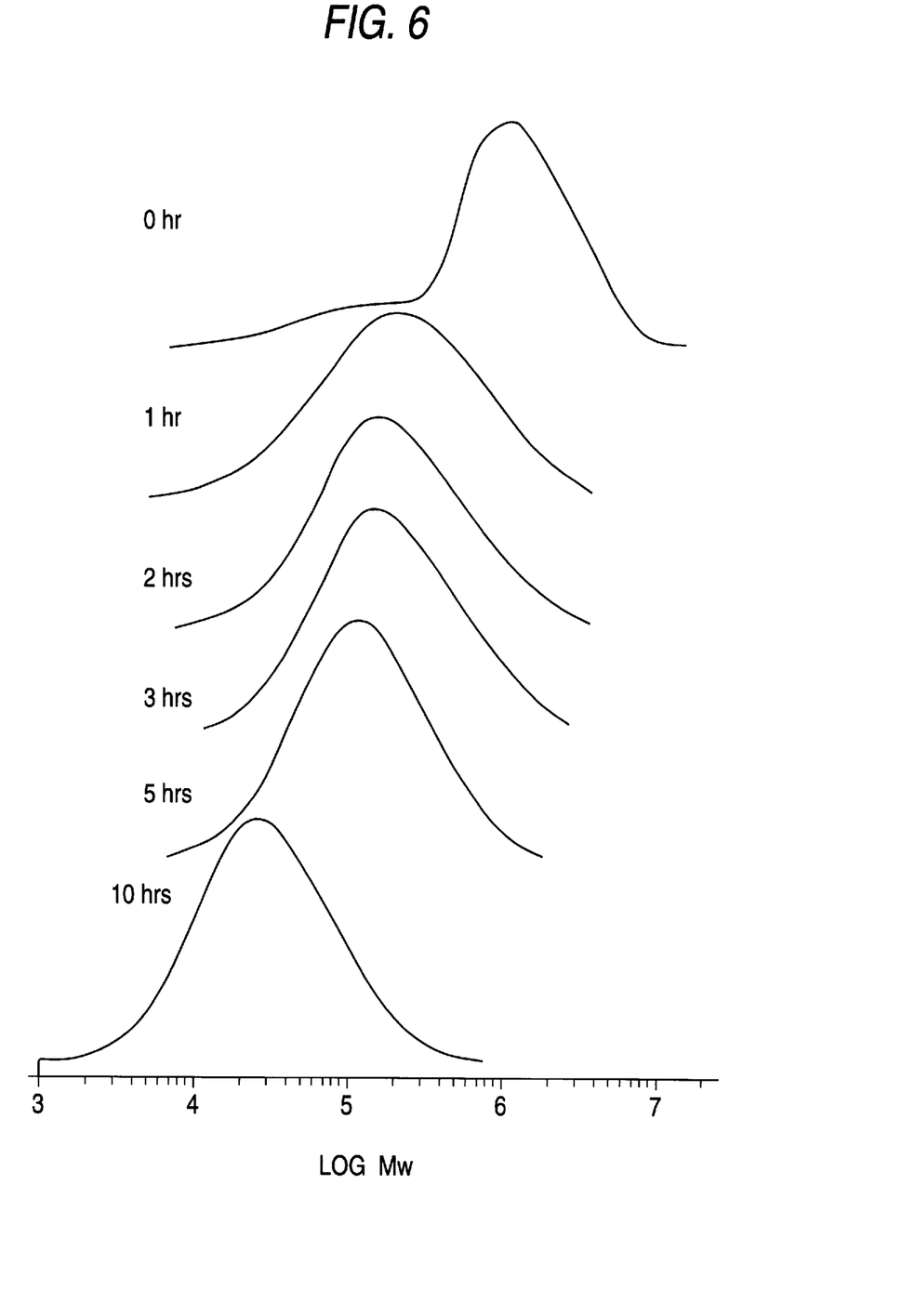
FIG. 6 is a graph illustrating variations of the molecular weight distribution brought by decomposition reaction in Example 5.

(6) Variations in the molecular weight distribution in Example 5:

Variations in the molecular weight distribution, as measured by GPC, of natural rubber sampled at intervals of a predetermined time is shown in FIG. 6. From FIG. 6, it has been found that the longer the reaction time, the sharper single peak the distribution indicates.

Examples 11–17

In a shaking flask, 200 ml of the deproteinized natural rubber latex (solid content: 20 wt. %) which had been obtained in Referential Example 1 were charged, followed by the addition of the radical forming agent in a proportion based on the rubber content. The kind and amount of the radical forming agent are as shown in Table 2. To the resulting mixture, a carbonyl compound was then added, followed by shaking at 65° C. for a predetermined time for air oxidation. The kind and the amount of the carbonyl compound and the reaction time are as shown in Table 2. The shaking was conducted with an amplitude of 2 cm and frequency of 135 times/min. After the completion of the reaction, the reaction mixture was purified by reprecipitation three times with methanol, followed by vacuum drying, whereby depolymerized natural rubber was obtained.

Examples 18–24

In each example, in a similar manner to Examples 11–17 except that the deproteinized natural rubber latex obtained in Referential Example 2 was used as a natural rubber latex and the solid content was changed to 10 wt. %, depolymerized natural rubber was obtained.

The kind and amount of each of the radical forming agent and the carbonyl compound, and the reaction time for air oxidation in Examples 11–24 are shown in Table 2.

TABLE 2

| | Radical forming agent | | Carbonyl compound | | |
|---|---|---|---|---|---|
| Ex. | Kind | Amount added (w.w %) | Kind | Amount added (v/v %) | Reaction time (hours) |
| 11 | Ammonium persulfate | 0.1 | Formaldehyde | 2 | 3 |
| 12 | Ammonium persulfate | 0.5 | Acetaldehyde | 2 | 3 |
| 13 | Potassium persulfate | 0.5 | Acetaldehyde | 5 | 3 |
| 14 | Lauroyl peroxide | 1.0 | Acetone | 2 | 3 |
| 15 | Ammonium persulfate + sodium sulfite | 0.5 | Methyl ethyl ketone | 2 | 5 |
| 16 | Azoisobutylamidine hydrochloride | 0.5 | Benzyl methyl ketone | 2 | 5 |
| 17 | Azobisisobutyronitrile | 0.5 | Paraformaldehyde | 2 | 5 |
| 18 | Ammonium persulfate | 0.1 | Formaldehyde | 2 | 3 |
| 19 | Ammonium persulfate | 0.5 | Acetaldehyde | 2 | 3 |
| 20 | Potassium persulfate | 0.5 | Acetaldehyde | 5 | 3 |
| 21 | Lauroyl peroxide | 1.0 | Acetone | 2 | 3 |
| 22 | Ammonium persulfate + sodium sulfite | 0.5 | Methyl ethyl ketone | 2 | 5 |
| 23 | Azoisobutylamidine hydrochloride | 0.5 | Benzyl methyl ketone | 2 | 5 |
| 24 | Azobisisobutyronitrile | 0.5 | Paraformaldehyde | 2 | 5 |

The form, inherent viscosity $[\eta]$, number-average molecular weight Mn, weight-average molecular weight Mw and Mw/Mn of each of the deproteinized natural rubber obtained are shown in Table 3.

The inherent viscosity was measured under the conditions similar to the above by an Ubbellohde viscometer.

The molecular weight was measured by GPC.

TABLE 3

| Ex. | Form | Inherent viscosity $[\eta]$ | Mn ($\times 10^3$) | Mw ($\times 10^3$) | Mw/Mn |
|---|---|---|---|---|---|
| 11 | Liquid | 0.53 | 19 | 50 | 2.6 |
| 12 | Liquid | 0.31 | 15 | 37 | 2.5 |
| 13 | Liquid | 0.18 | 10 | 25 | 2.5 |
| 14 | Liquid | 0.18 | 6.6 | 15 | 2.3 |
| 15 | Liquid | 0.35 | 11 | 29 | 2.6 |
| 16 | Liquid | 0.37 | 14 | 29 | 2.1 |
| 17 | Liquid | 0.20 | 5.0 | 11 | 2.2 |
| 18 | Liquid | 0.21 | 7.1 | 16 | 2.3 |
| 19 | Liquid | 0.35 | 12 | 27 | 2.6 |
| 20 | Liquid | 0.50 | 30 | 77 | 2.6 |
| 21 | Liquid | 0.80 | 45 | 122 | 2.7 |
| 22 | Liquid | 0.15 | 4.6 | 15 | 3.2 |
| 23 | Liquid | 0.25 | 27 | 56 | 2.1 |
| 24 | Liquid | 0.36 | 19 | 49 | 2.6 |

From the above table, it has been found that the depolymerized natural rubber obtained in each of Examples 11–24 is a liquid rubber which is almost colorless, is odorless and has narrow molecular weight distribution.

While the invention has been described in detail and with reference to specific embodiments thereof, it will be apparent to one skilled in the art that various changes and modifications can be made therein without departing from the spirit and scope thereof.

What is claimed is:

1. A process for preparing a depolymerized natural rubber, which comprises the steps of:

reacting a carbonyl compound with a natural rubber latex, and subjecting the resulting natural rubber to air oxidation in the presence of a radical forming agent to produce a depolymerized natural rubber product.

2. The process as in claim 1, wherein the radical forming agent is selected from a peroxide-based radical forming agent, a redox-based radical forming agent and an azo-based radical forming agent.

3. A process for preparing a depolymerized natural rubber, which comprises the steps of:

reacting a carbonyl compound with a latex of deproteinized natural rubber, and then subjecting the resulting deproteinized natural rubber to air oxidation to produce a depolymerized natural rubber product.

4. The process as in claim 3, wherein the oxidation of the depolymerized natural rubber is conducted in the presence of a radical forming agent.

5. The process as in claim 4, wherein the deproteinized natural rubber has a nitrogen content of 0.1 wt. % or lower.

6. The process as in claim 2, wherein the radical forming agent is a peroxide-based radical forming agent selected from the group consisting of benzoyl peroxide, di-t-butyl peroxide, potassium persulfate, ammonium persulfate, hydrogen peroxide, lauroyl peroxide, di-isopropyl peroxycarbonate and dicyclohexyl peroxycarbonate.

7. The process as in claim 2, wherein the radical forming agent is a redox-based radical forming agent selected from the group consisting of cumene hydroxyperoxide/Fe (II) salt, hydrogen peroxide/Fe (II) salt, potassium persulfate/sodium sulfite, ammonium persulfate/sodium sulfite, sodium perchlorate/sodium sulfite, cerium sulfate (IV)/alcohol, cerium sulfate (IV)/amine, cerium sulfate (IV)/starch, benzoyl peroxide/dimethyl aniline, and lauroyl peroxide/dimethyl aniline.

8. The process as in claim 2, wherein the radical forming agent is an azo-based radical forming agent selected from the group consisting of azobisisobutyronitrile, methyl azobisisobutyrate, azobiscyclohexane carbonitrile, azobisisobutylamidine hydrochloride and 4,4-azobis-4-cyanovaleric acid.

9. The process as in claim 5, wherein the radical forming agent is a peroxide-based radical forming agent selected from the group consisting of benzoyl peroxide, di-t-butyl peroxide, potassium persulfate, ammonium persulfate, hydrogen peroxide, lauroyl peroxide, di-isopropyl peroxycarbonate and dicyclohexyl peroxycarbonate.

10. The process as in claim 5, wherein the radical forming agent is a redox-based radical forming agent selected from the group consisting of cumene hydroxyperoxide/Fe (II) salt, hydrogen peroxide/Fe (II) salt, potassium persulfate/sodium sulfite, ammonium persulfate/sodium sulfite, sodium perchlorate/sodium sulfite, cerium sulfate (IV)/alcohol, cerium sulfate (IV)/amine, cerium sulfate (IV)/starch, benzoyl peroxide/dimethyl aniline, and lauroyl peroxide/dimethyl aniline.

11. The process as in claim 5, wherein the radical forming agent is an azo-based radical forming agent selected from the group consisting of azobisisobutyronitrile, methyl azobisisobutyrate, azobiscyclohexane carbonitrile, azobisisobutylamidine hydrochloride and 4,4-azobis-4-cyanovaleric acid.

12. The process as in claim 2, wherein the radical forming agent is present in an amount of 0.1–1 wt. % based on the rubber content.

13. The process as in claim 5, wherein the radical forming agent is present in an amount of 0.1–1 wt. % based on the rubber content.

14. The process as in claim 2, wherein the carbonyl compound is present in an amount of 1–10 vol. % based on the volume of the latex.

15. The process as in claim 5, wherein the carbonyl compound is present in an amount of 1–10 vol. % based on the volume of the latex.

16. The process as in claim 2, wherein the depolymerized natural rubber product has a number-average molecular weight of 50,000–2,000 as measured by gel permeation chromatography.

17. The process as in claim 5, wherein the depolymerized natural rubber product has a number-average molecular weight of 50,000–2,000 as measured by gel permeation chromatography.

18. The process as in claim 2, wherein the depolymerized natural rubber product has a molecular weight distribution Mw/Mn of 4 or lower.

19. The process as in claim 5, wherein the depolymerized natural rubber product has a molecular weight distribution Mw/Mn of 4 or lower.

20. The process as in claim 2, wherein the carbonyl compound is an aldehyde or ketone compound.

21. The process as in claim 5, wherein the carbonyl compound is an aldehyde or ketone compound.

* * * * *